United States Patent [19]
Hilger et al.

[11] 3,924,300
[45] Dec. 9, 1975

[54] SHUTTEL CAR MECHANISM FOR TRANSFERRING LOADS BETWEEN TWO STATIONS

[75] Inventors: Edwin T. Hilger; James S. Miller, both of Louisville, Ky.

[73] Assignee: A-T-O, Inc., Willoughby, Ohio

[22] Filed: June 4, 1973

[21] Appl. No.: 366,743

Related U.S. Application Data
[62] Division of Ser. No. 232,755, March 8, 1972, Pat. No. 3,746,148.

[52] U.S. Cl. .......................... 214/16.4 A; 214/16 B
[51] Int. Cl.² ........................................... B65G 1/06
[58] Field of Search ........ 24/16.4 A, 16 B, 16.1 CB, 24/16.1 CC, 705; 198/219

[56] References Cited
UNITED STATES PATENTS

| | | | |
|---|---|---|---|
| 2,602,557 | 7/1952 | Sinclair | 214/16.1 GB |
| 2,967,634 | 1/1961 | Bogar et al. | 214/16.1 CB X |
| 3,182,823 | 5/1965 | Chasar | 214/16.4 A |
| 3,232,455 | 2/1966 | Fountain et al. | 214/16.4 A |
| 3,366,254 | 1/1969 | Peter | 214/16.1 CB |
| 3,507,406 | 4/1970 | Zollinger | 214/16.4 A |
| 3,519,149 | 7/1970 | Saul | 214/164 A |
| 3,592,348 | 7/1971 | Atwater | 214/16.4 A |
| 3,709,383 | 1/1973 | Jennings et al. | 214/16.4 B |
| 3,710,957 | 1/1973 | Small | 214/16.1 CC |

*Primary Examiner*—Robert J. Spar
*Assistant Examiner*—R. B. Johnson
*Attorney, Agent, or Firm*—John K Crump

[57] ABSTRACT

An article storage and retrieval system includes a series of rack-like structures as a storage means and one or more stacker cranes providing direct access to the racks for article transfer purposes. A shuttle car mechanism of the self-propelled type is used for effecting the transfer of articles or loads relatively in either direction between an intermediate transfer provided for the articles along the base of the storage rack and a conveyor located along the opposed end of the mechanism. The car mechanism includes a bed portion supported by pairs of radius arms for arcuate or vertical swing movement through the transfer station and the conveyor with which it is associated as the mechanism is operated to effect the pick-up of an article or load from a first of the stations or locations and the depositing of the article or load at the second of the stations or locations.

2 Claims, 15 Drawing Figures

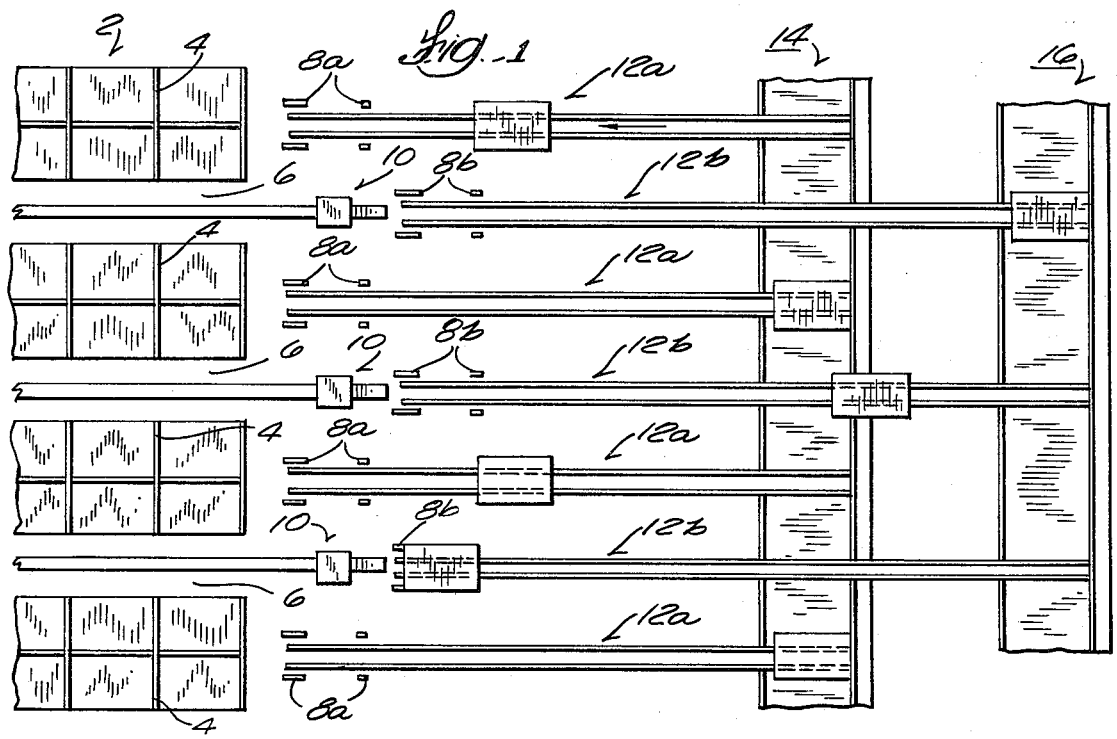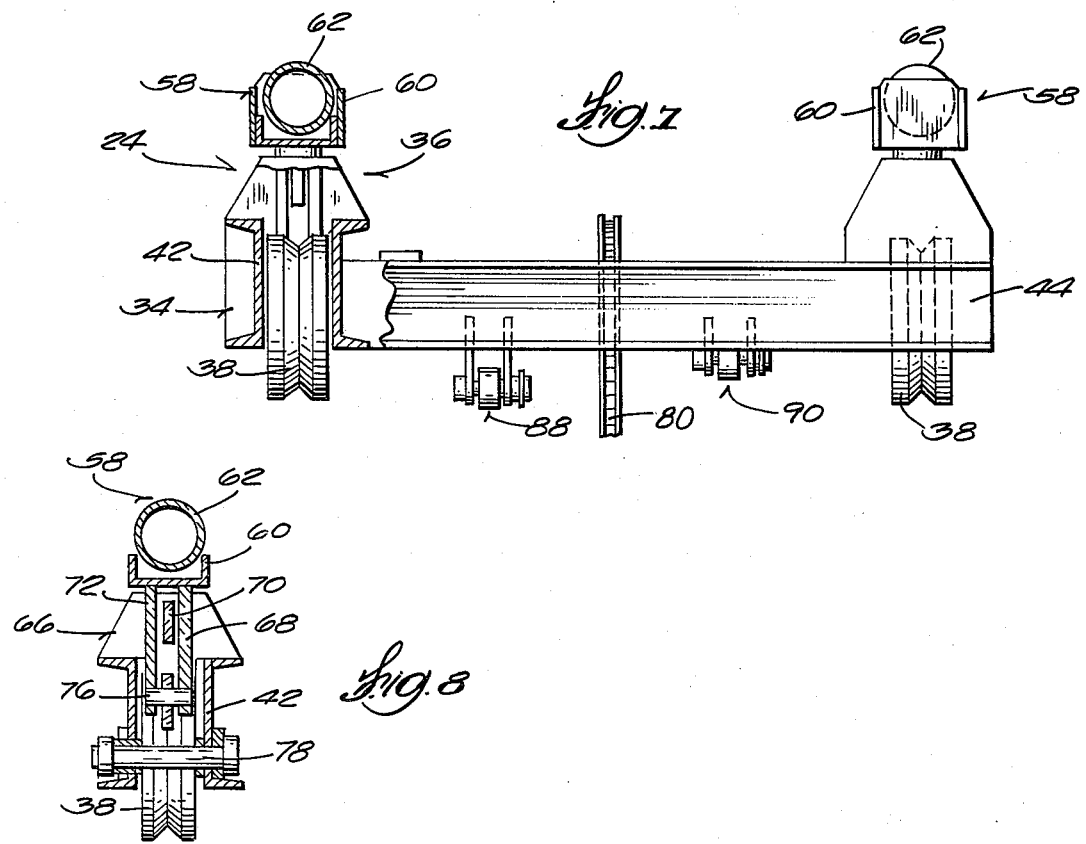

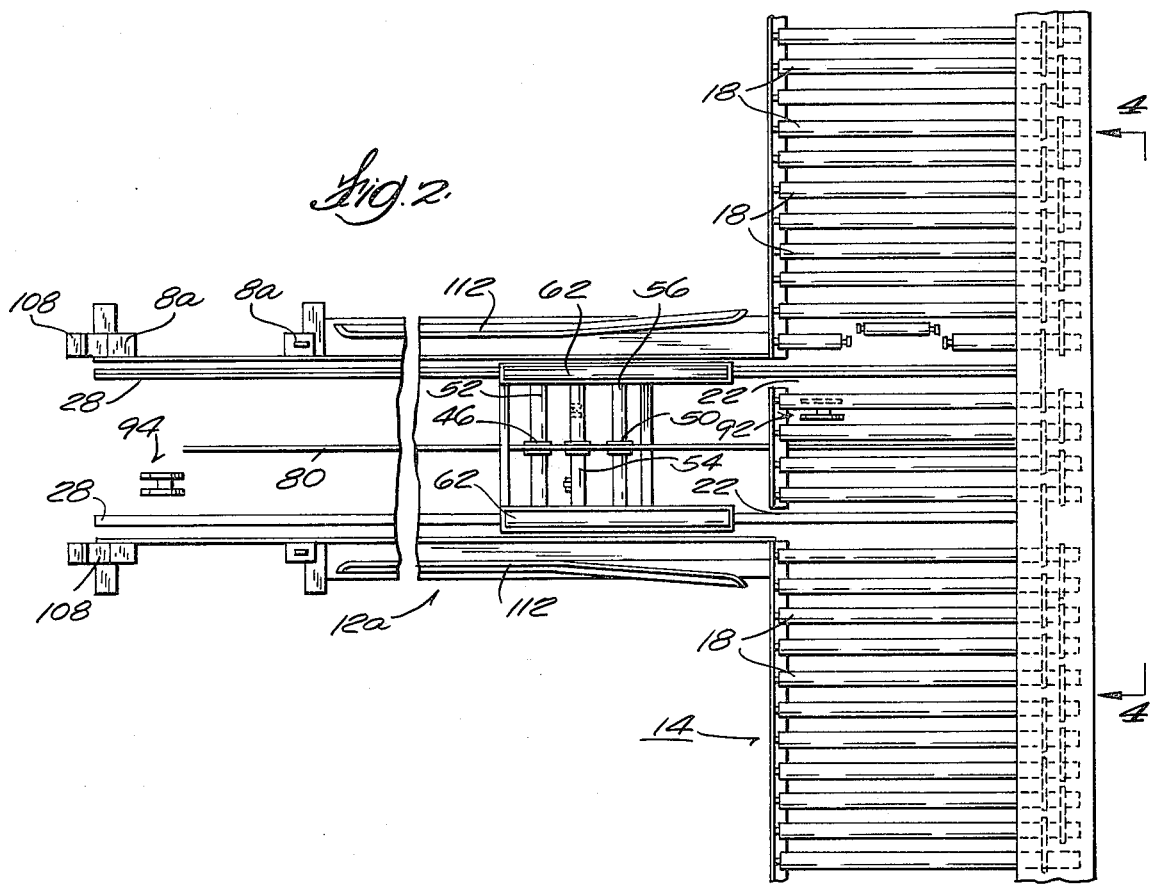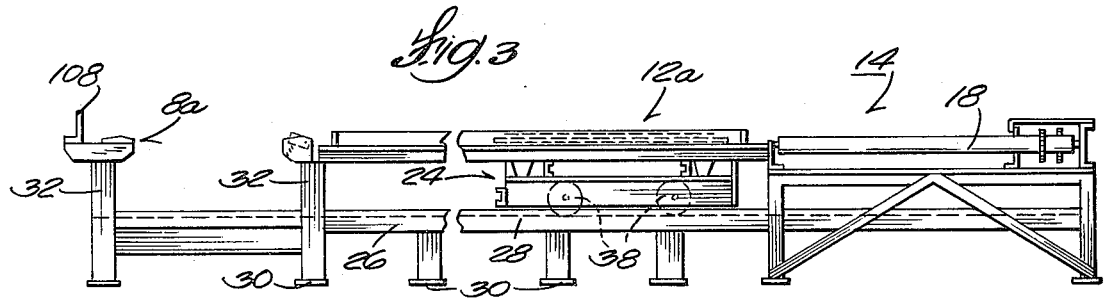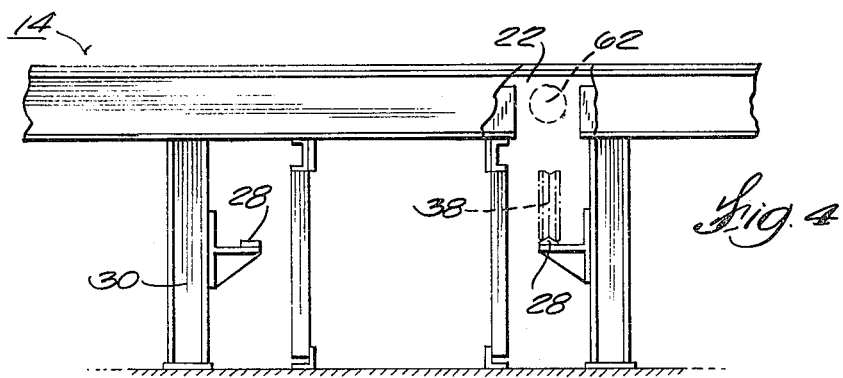

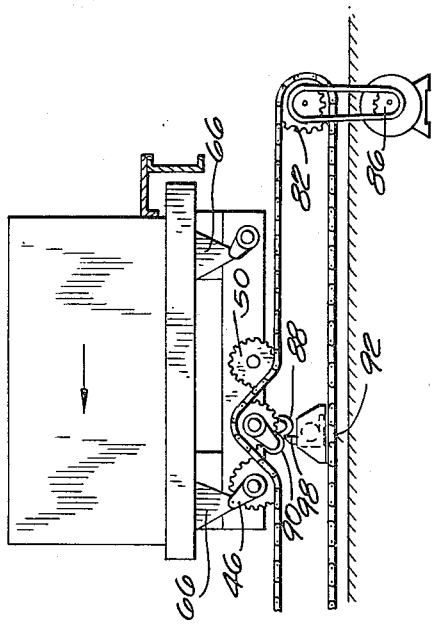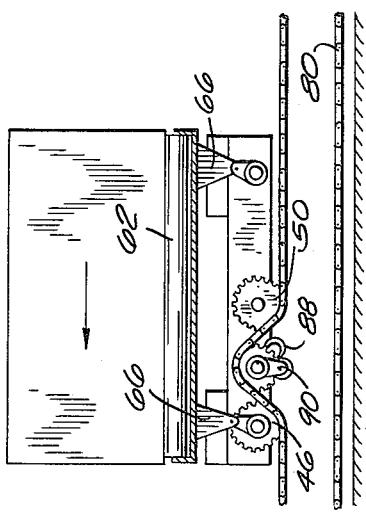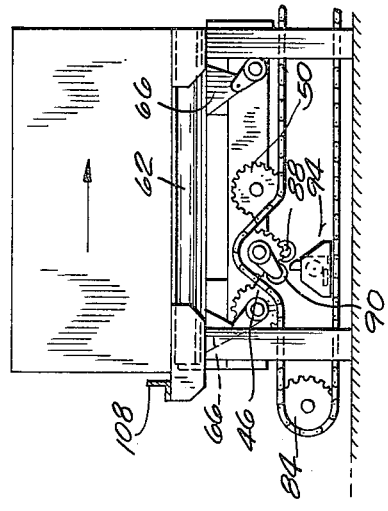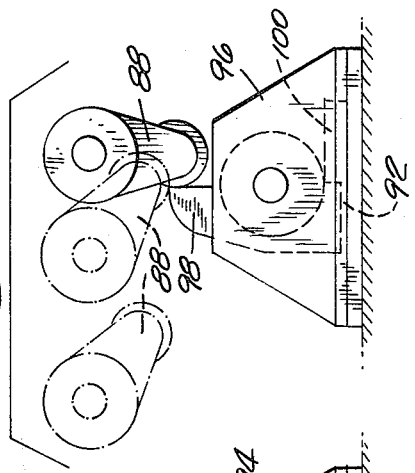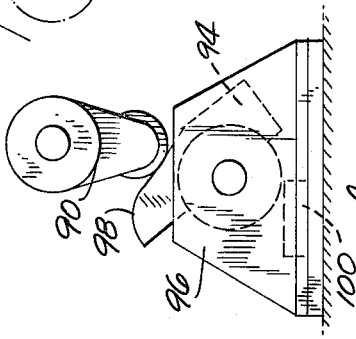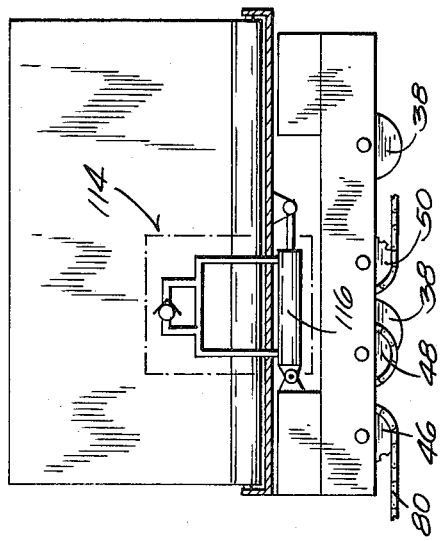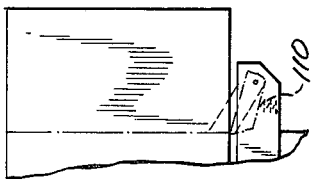

SHUTTEL CAR MECHANISM FOR TRANSFERRING LOADS BETWEEN TWO STATIONS

The present application is a division of U.S. Pat. application Ser. No. 232,755, filed Mar. 8, 1972, now issued to U.S. Pat. No. 3,746,148 dated July 17, 1973.

This invention is directed to a load transfer mechanism of the type which has a vertically movable bed portion and which has a means for effecting an automatic lifting and lowering of the bed portion as the mechanism cycles between load pick-up and delivery stations whereby to effect the transfer therebetween of an article or load.

It is known to effect the transfer of an article from one station to another by a mechanism which has a vertically movable bed portion and which is adapted to be elevated when the mechanism is moved to the station at which the article is positioned to effect the pick-up of the article or load and which is adapted to be lowered when the mechanism is moved to a second station to cause the article or load to be deposited thereat. This general type of mechanism has been utilized heretofore in conjunction with multiple aisle type storage and retrieval systems for articles to effect the distribution of the incoming articles relatively among the various separate bays or sections of the storage rack and to also effect the transporting of the articles being retrieved from storage relatively from the various bays or sections of the rack to a discharge or take off conveyor. In this type of application, one or more pair of individual transfer mechanisms are provided for each of the separate bays or sections of the rack structure, with one of the mechanisms of each such pair being designed to handle incoming of the articles and coupled at its outer end directly to a common feed conveyor for the articles and the other being designed to handle outgoing articles and being coupled at its outer end to a common discharge or take-away conveyor for the articles. The inner ends of the mechanisms generally have a fixed platform-like support associated therewith and as any article is moved into or out of storage it is received on such a platform prior to transfer into the rack or prior to pick-up by a mechanism for transport from the rack, as the case may be. The rack itself is equipped with a series of motorized transport devices which operate in the aisles formed between the separate bays or sections of the rack structure to effect the movement of articles relatively between the rack and the platforms, being formed with lift means for initial pick-up of the articles from either the platform or the rack itself and for then depositing the article on the other of the platform or rack and such lift means being swingable or rotatable so as to permit the transport device to act between one or more pairs or sets of the platforms at any one bay or section of the rack structure.

These transfer mechanisms while having particular utility in and special aptness to a storage and retrieval system such as described, have, to the present time at least, had a number of inherent drawbacks or limitations which prevented a wider acceptance and use thereof in such systems and in other applications of a similar or like nature. For one thing, in the prior forms of these transfer mechanisms the bed portion thereof generally was controlled for lifting and lowering movement relatively of the article or load supporting and/or receiving structures, viz., the conveyors on the one hand and the various pedestal-like platforms in and along the storage racks on the other, through piston-cylinder mechanisms of either the hydraulic or pneumatically operated type or through some type of motor driven gear or lever mechanism. This made it necessary to run hydraulic or pneumatic lines or electrical wiring into the transfer mechanism and in and along the path of travel of such mechanism between the conveyors and the particular one of the pedestals associated with such mechanism. While this created no particular burden or problem insofar as any one such transfer mechanism was concerned, in actual practice, wherein there may be as many as 100 or more separate such mechanisms in a single system or installation, the installing of this conduiting or wiring in the system in a way as to maintain the system relatively free of clutter and the individual transfer mechanisms thereof free for cycling movement between the conveyor and the article support pedestals or platforms without obstruction from any of the conduiting or wiring, can, and often times does, become a matter of some complexity. Moreover, it also becomes necessary, in the instance of a hydraulic or pneumatic type bed actuator, to incorporate suitable switches, valves, regulators and the like into the conduiting or flow lines of each of the separate transfer mechanisms to control the lifting and lowering of the bed portion in relation to the travel of the mechanism between load pick-up and delivery positions in its operating cycle and these control devices added to those for controlling the movement of the transfer mechanism and the load carrier devices themselves resulted in a system which was not only extremely costly and difficult to repair and troubleshoot but which also has a relatively low overall degree of operational reliability.

Then, too, in the conventional construction of these transfer devices, the load transfer mechanism generally contained its own source of motive power for powering the same for translatory travel between the conveyors and the platforms and, here again, it became necessary to extend additional lines into each of the individual trucks in the system to drive the same for motion therein. This added further cost and complexities to the overall system.

A further drawback which existed in these prior forms or designs of transfer mechanisms, as applied to an article storage and retrieval system of the general type described, related to the relatively close tolerances normally required to be maintained between the loads and the load transport devices at the point in the load transfer cycle at which the article has been deposited on the delivery station by the transfer mechanism and is in a condition of readiness for pick-up action by the transport device. More particularly, for the standard type cranes or stackers the articles are required to be placed on the receiver platform to within one-quarter of an inch plus or minus of a prescribed position and in order to achieve this it has heretofore been necessary to provide rather elaborate controls in and along both the feed conveyor and the transfer mechanism itself to initially assure the article being halted on the conveyor in an exact position and to thereafter hold the position of the article as it is moved off the conveyor by the transfer mechanism. This injects still further costs and complications into the overall system and even then is only partially effective in attaining the requisite positional accuracy required in the articles on the delivery platforms.

This invention has for its general objective the provision of a load transfer mechanism of the general type described which features an all around improved and simplified construction both as regards the means employed for effecting the raising and lowering of the bed portion thereof during the course of a load transfer cycle of operation and for attaining the requisite accuracy of positioning between the load and the related transport or carrier means which is to receive the load from the mechanism.

A more specific objective of the invention is the provision of a load transfer mechanism wherein the movable bed portion therein is actuated by mechanical linkage means forming an integral part of the mechanism itself and which is dependent for its operation entirely upon the movement of the transfer mechanism itself.

A further object of the invention is the provision within a load transfer mechanism of the type mentioned of a lifting and/or lowering means for the bed thereof which is wholly mechanical in nature, being formed to include camming elements and follower arms co-acting with one another and with other mechanical means in the apparatus to move the bed portion into and/or out of raised or lowered positions in the mechanism during the course of a load transfer operation.

A further object of the invention is the provision in such mechanism of a bed lifting and/or lowering means which is self-controlled, being directly and solely dependent upon the movement of the mechanism to and through given portions of its travel between the load pick-up and load delivery stations for its operation and being formed throughout of self-re-setting and/or self-return type components and assemblies.

A still further object of the invention is the provision of a load transfer apparatus mechanism wherein an over center swing action is utilized in the movable bed portion thereof for positively retaining the bed in a raised position after receiving a load and during movement of the same to a load deposit station.

A yet further object of the invention is the provision of a load transfer mechanism in which the bed portion during the time the mechanism is moving linearly in a direction relatively away from the load pick-up station is caused to be moved arcuately in a direction which is opposed to that in which the mechanism itself is moving so as to, in effect, provide a true vertical movement of the bed portion with respect to the pick-up station, the purpose being to effect a drag-free pick-up and depositing action of the loads being handled by the device, even though the mechanism is in movement during such operation.

A still further object of the invention is the provision of a movable bed type load transfer mechanism in which a dampening action is provided the bed portion during return to a lowered position in the mechanism whereby to reduce shock in the load itself during deposit at the load receiving station while at the same time providing more accurate, closer control over the position of deposit of the load at such station.

A still additional object of the invention is the provision of a load transfer mechanism which has one or more angularly disposed guide plates associated therewith for engaging a load along one or the other of its sides as it is drawn by the mechanism from a load pick-up station whereby to effect a centering of the load on the mechanism.

An ancillary object of the invention is the provision of a load transfer mechanism in which the movable bed portion thereof supports the load on pairs of roller means journalled longitudinally within the mechanism so as to enable a load to be shifted laterally of the mechanism by a light force applied to one or the other sides of the load.

A still further object of the invention is the provision in such a load transfer mechanism of a positive type drive means for the mechanism and which includes an endless lineal member connected between the mechanism and a fixed power source is closed loop fashion for moving the mechanism in either direction between two stations, such lineal member drivingly engaging gear means in the mechanism and, while normally restricted against movement with respect to the mechanism and the gear means, under certain conditions is movable by such gear means relatively of the mechanism whereby to cause a lifting of the bed portion thereof through additional gear and lever means interposed between the bed portion and the mechanism itself.

A yet further object of the invention is the provision of a movable bed type load transfer mechanism wherein the bed portion after being moved into a raised position to receive a load is moved to a load delivery station which includes a one-way acting block or stop means for the load and is then reversed in its direction of movement to cause the load to engage the block and to remain at the station as the transfer mechanism withdraws therefrom, it being the purpose, too, to cause the bed portion to lower back into the mechanism by gravity by the action between the load and block.

The above and other objects and advantages of the invention are achieved in a transfer mechanism which, in accordance with a presently preferred embodiment of the invention, includes a carrier portion rollingly supported on a fixed rail structure for bidirectional movement between a load pick-up station and a load delivery station. A reversible drive motor located at one end of the rails is connected to the frame of the carrier by an endless precision chain to power the carrier for two-way travel between the stations, the chain being extended through a series of snubbing sprockets carried by the carrier frame on suitable shafts and between and around head and tail sprockets fixedly mounted at the opposed ends of the rail to form a direct driving couple between the motor and the carrier. The support shaft of one of the snubbing sprockets has two separate follower arms secured thereto and which depend from the carrier for engagement with individual of a pair of fixed tripper arms or cams located adjacent the load and unload stations, the arms being angularly out of phase with one another such that as one arm is moved from the vertical by a tripper arm the other of the arms will swing into a vertical position. The supporting shaft of a further one of the idler sprockets is connected with a separate bed portion of the carrier through a pair of radius or rock arms to form with another such shaft in the frame portion and a second pair of radius or rock arms a vertically pivotable mounting for the bed in the carrier. The cam-like tripper arms are arranged one in the path of travel of a first of the radial arms carried by the carrier adjacent to one of the two stations, with the other located in the path of travel of the second of the radial arms adjacent to the opposite station. The cams are mounted for pivotal movement so as to act in one direction only and in a preferred embodiment are formed with a vertically extending cam surface which has a curved or arcuate camming edge positioned in oppositely facing relation to one another and relatively in a direction as will result in the follower arm of the carrier with which it is aligned striking such curved edge portion after the carrier has completed its movement in one direction and is proceeding relatively in the opposite direction of movement.

Assuming the bed to be in a normally lowered position in the carrier and taking the instance where the carrier is being moved to a load pick-up station, the follower arm which is aligned with the tripper at such station will merely engage and cause the tripper arm to pivot out of its way as the carrier moves to a "home" position at such station. However, as the carrier is then caused to be moved away from the station, the follower arm upon re-engaging such cam will be displaced angularly an amount sufficient to clear the cam. This angular displacement of the follower arm is transmitted by the chain to the other of the snubbing sprockets to cause a corresponding angular displacement of such sprocket. This, in turn, results in an angular force on the bed portion of the truck which is effective to cause the latter to be lifted progressively from a normal, lowered position in the truck as the radial arm rides up on and then over the cam, and, with the truck at this point moving relatively away from the pick-up station or platform, the bed is caused to swing up through such station to effect a load pick-up action. The throw of the radius arm is designed to cause the bed to be forced to an over center position in the carrier, thereby assuring that the bed remains in an elevated position as the carrier proceeds to the other or load delivery station.

The other of the fixed cams co-acts with the other of the radial arms on the truck in a somewhat similar manner, only to cause, in this instance, a lowering of the bed portion of the truck at the point where the truck is moving from rather than towards the transfer platform, inasmuch as at this end of the truck the loads are being moved onto the truck rather than from the truck. The raising of the truck bed portion is followed by a return movement into the truck of the bed portion, after the bed has cleared the platform or conveyor, by the cam follower roller riding off the end of the camming edge of the trip arm.

The angular displacement between the follower arms on the mounting shaft is correlated to the configuration of the cam rollers in a manner as results in either of the cam rollers being rotated to a radially downward extending position from a tripped position as the other of the rollers is rotated by the tripper arm to a tripped position from a normal or neutral, radially downward position. In this way, a self-re-setting of the cam rollers is effected to assure the shuttle truck operating in the intended manner to effect article transfer action.

With the described construction there is no need for extending separate power or supply lines into the carrier portion of the transfer device for the purposes either of raising and lowering the bed portion of the truck as the latter moves into and then from load pick-up and delivery positions, or of powering the truck for movement between article or load pick-up and delivery positions, and because of this the truck may be constructed substantially simpler and at considerably less expense than heretofore possible. At the same time, with the present design, matters of maintenance and operational reliability becomes less of a problem as compared with the construction followed in more conventional designs of such transfer devices. These savings in cost and in maintenance in the individual transfer devices become extremely significant when considering a total load storage system embodying as many as 100 or more separate such transfer devices in some known instances.

Among other features, in the load transfer device of the invention it is contemplated to mount a pair of guide or deflector plates in the framework structure for guidingly engaging the loads along both sides thereof as the load is moved off the platform by the carrier to cause an automatic centering action of the load on the truck. These plates eliminate the necessity of limit switches, fixed stops, pushers and the like to accomplish load "squaring" and represents a considerably more effective, less complex and less expensive means for carrying out load squaring.

Along this line, it is contemplated to provide the transfer stations or platforms with one-way acting block-like elements for engaging the load bed of the carrier as the latter is moved relatively away from the load pick-up station. These blocks serve both to index the load in a first direction on the bed during withdrawal from the pick-up station and also to provide a positive force against the bed urging the same to drop to a lowered position in the carrier. The bed itself preferably includes two rollers extending lengthwise of the carrier and a side plate is mounted at the pick-up station to engage the load as it moves from the station, whereby to index the load relatively of the bed in a second direction.

Other objects and advantages of the present invention will appear in the course of the detailed description of the invention appearing hereinafter.

The accompanying drawings illustrate the best mode presently contemplated of carrying out the invention.

In the drawings:

FIG. 1 is a diagrammatic plan view of a portion of an article storage and retrieval system embodying the novel shuttle car mechanisms of the present invention;

FIG. 2 is an enlarged plan view of a portion of the article storage and retrieval system, depicting the general relationship of one of the shuttle car mechanisms used to handle incoming articles to the infeed conveyor and to the platform which supports the articles or load in and along the storage rack proper;

FIG. 3 is a side elevation of the structure shown in FIG. 2;

FIG. 4 is a view taken along the lines 4—4 of FIG. 2, showing on an enlarged scale more of the structural interrelationship between the shuttle car mechanisms and the feed conveyor with certain parts broken away and others shown in phantom for clarity of illustration;

FIG. 7 is an end view, partly in elevation and partly in section, of the shuttle car mechanism shown in FIGS. 5, 6A and 6B;

FIG. 8 is a view in vertical section of one of the radius arm type connectors which are provided for supporting the bed portion of the shuttle car mechanism for vertical movement;

FIGS. 9A, 9B and 9C illustrate diagrammatically successive portions of one of the shuttle car mechanisms of the invention in moving between an article or load pick-up position at the feed conveyor and an article or load delivery position at one of the support platforms;

FIG. 10A is a view showing the manner in which a first of the follower rollers of a shuttle car mechanism is swung through a prescribed arc by a first of the tripper cams as the mechanism moves from an article or load pick-up position adjacent the feed conveyor;

Figure 5:
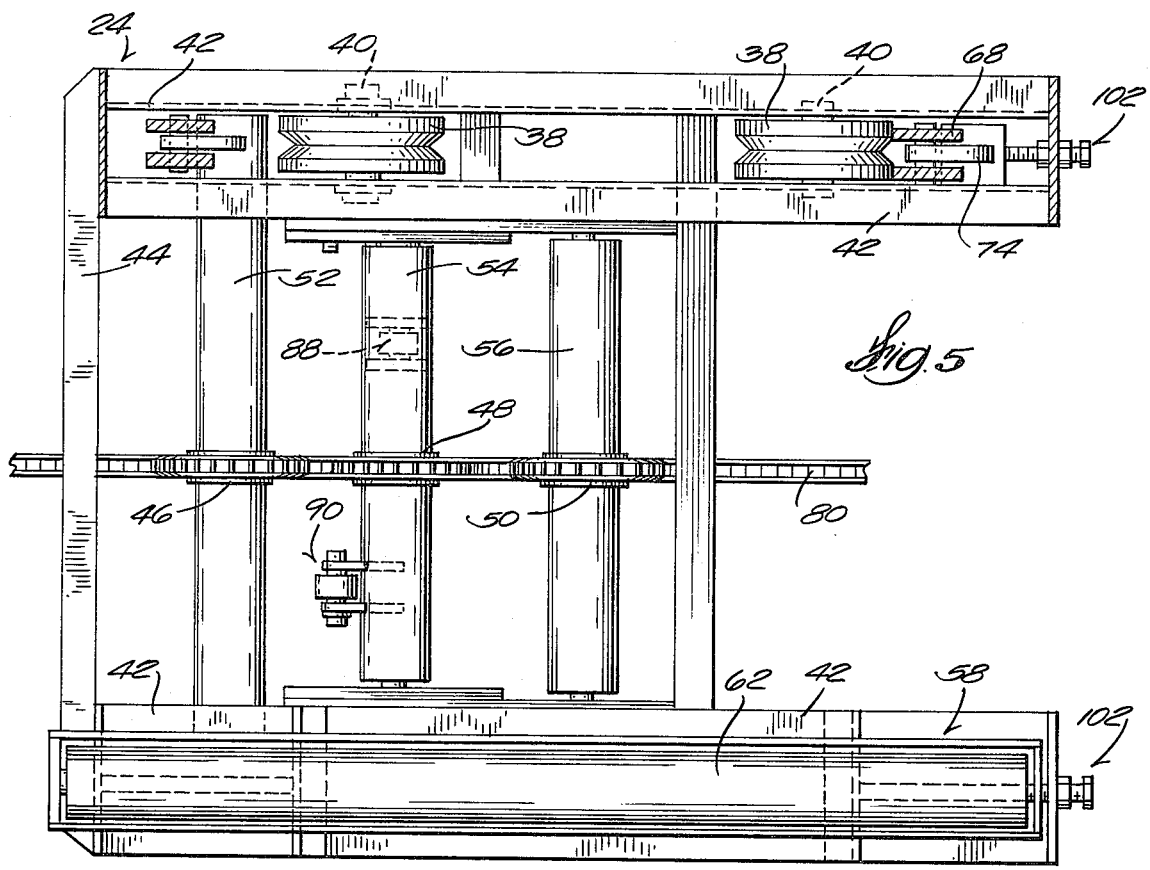
FIG. 5 is an enlarged plan view of one of the novel shuttle car mechanisms of the invention, with certain parts thereof being omitted and with others selectively shown in section and in phantom to facilitate an understanding of the construction.

FIG. 10B is a view showing the manner in which the other of the follower rollers of a shuttle car mechanism clears a second of the tripper cams as the mechanism approaches an article or load pick-up position at a support platform; and FIG. 11 depicts certain modifications which are made to the shuttle car mechanisms and to the support platforms to insure a precise positioning of an incoming article or load on the support platform, the one view being of the shuttle car mechanism and the other being of the modified part of the support platform.

The drawings and FIG. 1 in particular show the improved shuttle car mechanisms of the invention as being incorporated within an article storage and retrieval system of the type in which the storage means is in the form of a rack structure 2 having a series of parallel extending bays 4 of multiple-level construction and which are separated one from the other by access aisles or corridors 6. Associated with the separate bays or sections of the rack structure are suitable platforms 8 defining supports for the articles at the interface of the shuttle car mechanisms with the rack structure. These supports or platforms are, for exemplary purposes only, shown to be positioned along the right hand side or face of the rack structure, as viewed in FIG. 1 for example, and the articles then in passing into the rack have a right-to-left movement, while in passing from the rack the movement is in a left-to-right direction. It is noted, too, that in the illustrated construction there are two such platforms for each of the bays, with one platform being located directly opposite the end of the bay and with the other located adjacent to such bay directly opposite the aisle or corridor which is formed, in part, by the one side or face of such bay. Those platforms located opposite the bays are intended to handle the incoming articles and, for purposes of differentiation are designated 8a, while those located along the ends of the aisles are designed to handle the outgoing articles and hereinafter will be designated 8b. It is to be recognized that the particular arrangement shown for these platforms 8a and 8b is illustrative only and that other arrangements may be utilized where desired or dictated by overall system requirements. Thus, for example, each of the bays could be provided with one or more additional pairs or sets of platforms 8a, 8b at one or both of the ends of the bays and aisles if it were desired to afford the system increased versatility and/or increased article handling capacity, it being understood, of course, that each added platform would entail an added shuttle car mechanism.

In all events, the articles themselves are adapted to be moved relatively between the platforms and the particular bay or bays of the rack structure with which they are associated by conventional, motorized type transport devices 10 which are mounted in the aisles 6 formed between the bays for travel both in a horizontal direction paralleling the bays, and in a vertical direction extending relatively from the lowermost level of the bays to the top or uppermost level whereby to provide direct access to all portions and levels of the various bays for article storage and withdrawal purposes. The mounting structure of the transport devices may be in accordance with conventional or known practice and, while not shown herein, generally included one or more fixed rails extending horizontally of the aisles and a vertical hanger or support for the device itself with such vertical member being movable relatively of the horizontal portion thereof to afford the device full and complete access to all possible storage positions in the racks. The transport devices normally embody some type of lift mechanism, such as a fork, for example, for engaging the articles for lift action when positioned either on the delivery platforms 8a or in the bays of the rack structure and for also effecting the depositing of an article on the platforms 8b or in the bays following the completion of a load transfer cycle of operation of the device. Means are provided also for effecting a limited turning of the lift means or the device itself in a horizontal plane of movement so as to enable the fork or other article engaging means of the devices to swing relatively between the pairs of platforms 8a 8b which are associated with the individual bays.

Details with regard to the construction of the transport devices and to the various controls and circuitry for operating the load transport devices in a manner which is integrated with the rest of the system are omitted herefrom as they form no part of the invention per se.

The shuttle car mechanisms of the invention, designated in the drawings by the reference numeral 12, are mounted along the right hand side or face of the rack structure directly opposite to and in positions of alignment with the aforesaid article support platforms 8a 8b with those mechanisms which are aligned with the platforms 8a being designed to handle articles being moved into storage and being accorded the designation 12a and with the other of the mechanisms, those which are aligned with the platforms 8b being adapted to handle articles being removed from storage and being accorded the designation 12b. The mechanisms associated with the stations or platforms 8a are associated with a first powered conveyor mechanism 14 which functions to feed articles relatively into the system from a related conveyor, processing line, assembly or work station or the like, not shown. This conveyor 14 is arranged transversely to the mechanisms along the outer or right-hand ends thereof and the articles, as will be explained more in detail hereinafter, in moving along such conveyor are adapted to be displaced 90° for direct transfer to any selected one of the transfer mechanisms 12a for ultimate storage in the particular bay of the storage rack which is associated with such mechanism in a substantially automatic fashion.

A similar such conveyor 16 is provided for the mechanisms 12b which are associated with the aforementioned delivery platforms or stations for the articles for receiving the articles after they have been brought out of storage and for moving the articles relatively to a conveyor or other receiving means (not shown) for ultimate passage to an assembly line, work station, etc., as desired. Conveyor 16 is arranged also transversely to the mechanisms along the outer or right-hand ends thereof, being in parallelism with the conveyor 14 previously described. In the illustrated arrangement, the discharge conveyor 16 is located to the right of the feed conveyor 14 and in order to permit the load transfer mechanisms 12b which are associated with such conveyor to be extended out to the same without interference from the feed conveyor the two groups of mechanisms and their respective associated platforms 8a 8b are located in elevationally spaced apart horizontal planes, as are the two conveyors 14 and 16. FIG. 3 of the drawings shows the elevation of one of the transfer mechanisms 12a as respects its associated platform 8a and conveyor 14. A similar elevational relationship exists among the several transfer mechanisms 12b and their respective platforms 8b and conveyor 16 with the particular elevation of these latter transport and support members being sufficiently above that shown for the mechanisms 12a, platforms 8a and conveyor 14 as will enable the load transfer mechanisms 12 b to be extended out to the discharge conveyor 16 without interference with or hindrance from the feed conveyor 14. The vertical spacing necessary between the load transfer mechanisms 12b and the feed conveyor 14 at the cross-over points is dependent, among other things, upon the height of the articles being handled in the system and the vertical spacing must be at least as great as the maximum height of any of the articles which are expected to be processed in the system.

The conveyors 14 and 16 are generally identically constructed, being formed of a multiplicity of separate rollers 18 mounted transversely between a pair of side rails of the respective framework portions of the conveyors to form a support and transport surface for the articles which is co-extensive in length with the conveyors. The rollers of the respective conveyors 14 and 16 are powered through a series of chain and sprocket units 20 which are connected from one roller to the next successively along the full length of the separate conveyors in a manner as to operatively couple together all the rollers of each of the conveyors for rotary motion in unison with one another. A drive motor (not shown) is provided for each of the conveyors with a suitable chain or belt-type member being provided to drivingly couple the motors to one of the sprockets at the units 20 of each of the two conveyors.

The conveyors are each provided with a series of elongate openings or voids 22 for receiving the load transfer mechanisms as the latter are moved to load pick-up or deposit positions with respect to the conveyors. These voids or openings, two of which are provided at each of the points along the conveyor which is opposite one of the load transfer mechanisms, are in the plane of the rollers 18 and open relatively toward the shuttle car mechanisms or, in this case towards the left side of the conveyors, with the left side of the roller support structure being broken away in the areas of these voids and with the rollers normally occupying such position being removed altogether from the conveyor. For this construction, it is, of course, necessary that the aforesaid chain-sprocket units 20 be arranged relatively along the right-hand side of the conveyors and that the chain of the sprocket and chain unit in such area of the conveyor be lengthened somewhat to span the gap. The rollers which are between any set of gaps or voids are supported in a frame segment which is carried by suitable uprights of the main sub-structure of the conveyors, as is best shown in FIGS. 2 and 4.

The load transfer mechanisms 12a and 12b are substantially identical of construction and operation to one another and it will be understood therefore that the ensuing detailed description of one of the mechanisms 12a for the incoming articles will apply as well to the mechanisms 12b, to the extent not otherwise specifically noted hereinafter. Generally, each such mechanism 12a comprises a load carrier or truck portion 24 and a fixed track structure 26 which supports the carrier for two-way travel between the feed conveyor 14 and a corresponding one of the platforms 8a at the storage rack structure 2. The track structure has a pair of elevated rails 28 which are supported in parallelism with one another by a number of upright posts 30 which are secured, in turn, to the floor or foundation of the installation site. The rails 28 terminate at one end under the conveyor 14, see FIG. 5 for example, and with the other end terminating along the outer or left-hand set of the four uprights 32 forming the platforms 8a at a level below the upper ends of such uprights 32.

The carrier or truck portion 24 and which comprises a lower, body portion 34 and a separate, vertically movable bed portion 36 is supported for travel on the rails 28 through sets of wheels 38 which are rotatably mounted in the body portion of the truck, along the ends thereof, on suitable stub shafts 40 which are journalled in the body portion by conventional bearing means. These wheels are preferably flanged to insure lateral stability of the truck 24 during travel on the rails 28. The body portion 34 has a generally U-shaped construction, being formed of a pair of side bars 42 connected at one end by a cross brace 44. Body portion 34 has a lateral dimension which is less than the lateral spacing between the uprights of the platforms so as to permit the truck to be received between the uprights 32 when moved to the extreme left hand end of the track structure. The cross brace 44 is located at the end of the truck which is adjacent to or faces the fixed platforms 8a along the storage rack so that the open end of the body portion is therefore towards the feed conveyor 14 and the truck is therefore free to be moved to the extreme right-hand end of the track structure 26 without interference from the substructure of the conveyor.

The body portion of the truck 24 has a series of three sprockets 46, 48 and 50 mounted therein on respective of a series of transverse shafts 52, 54 and 56 which are journalled in the side rails 42 of the body portion with the sprockets being centered on the shafts so as to be aligned with one another. These sprockets form an ancillary part of a chain-and-sprocket type drive mechanism which is provided for the truck and, in accordance with a particularly novel aspect of the invention, are combined with a cam-type lever mechanism in a way as to produce a reactive or counterforce in the vertically movable bed portion of the truck, under conditions to be described in detail, such as results in the bed portion 36 of the truck 24 being elevated to effect the pick-up of a load or article from, in this case, the feed conveyor 14 when the truck itself is moved into a load receiving position along the right-hand end of the track structure 26. The bed portion after being elevated to receive an article remains in such position as the truck moves, in this case, to the left-hand end of the track structure and into a load deposit position relatively to the particular platform 8a with which it is associated. At such time, the bed portion 36 is caused to return to a normally lowered position in the truck and in the course of this return movement the load or article previously received from the feed conveyor is caused to be deposited on the platform in question. Before considering this aspect of the invention, however, it is well to note further details of construction of the truck itself as well as of the drive means therefor. Initially, in this regard, attention is directed to FIGS. 5–8 of the drawings wherein are shown the details of bed construction and the means by which the bed is mounted to the framework. The bed 36 essentially includes two roller assemblies 58 arranged one along each side of the bed in generally paralleling relation with the body portion side rails 42. Each roller assembly 58 has a mounting or support rail 60 of channel-like cross-sectional configuration in combination with a roller 62 which is journalled lengthwise in each such support rail by suitable end bearings, the roller extending radially above the rail to define or present a support surface extending lengthwise along either side of the truck mechanism for the loads or articles to be carried thereby. The roller assemblies 58, while free of direct attachment to one another, are attached to the truck body portion 34 for pivoting movement as a unit relatively thereto by pairs of radius arm type connectors 66, there being one such connector at each end of each of the two roller assemblies or a total of four such connectors in all. Each such connector 66 includes a centrally split hangar or plate 68 welded or otherwise secured to the opposed ends of the roller support rails 60 along the underside thereof. A guide plate 70 which is welded between a pair of attachment flanges or ears 72 on the upper surface of the frame side rails 42 is straddled by the segments of the connector 66 to form a guide therefor when the bed is moved for vertical swing movement with respect to the body of the truck. The connectors each further include a radius or rocker arm 74 connecting the bed portion 36 to the body portion 34 and which has a free end fitting within the lower end of the split hangar or plate 68 and connected thereto as by a pivot pin 76. The rocker arms 74 located in the right-hand end of the truck device are connected by a pivot pin 78 directly to the side rails 42 of the truck body portion 34 while the opposite pair of rocker arms, those carried in the left-hand end of the truck, are rigidly attached to the corresponding ends of the mounting shaft 52 for the extreme left-hand sprocket, namely sprocket 46, the reason for which construction will appear hereinafter.

The chain-and-sprocket type drive mechanism for the truck 24 includes an endless precision chain 80 trained around and between a head sprocket 82 mounted at the right-hand end of the track structure 26 in a centered position to the rails 30 and a tail sprocket 84 arranged at the opposite or left-hand end of the track structure in similarly centered relation to the rails 30. The upper flight or run of the chain passes under the end positioned sprockets 46 and 50 and over the intermediate sprocket 48 as shown, whereby to engage the truck to the chain for translatory movement on the rails 28 and between the feed conveyor 14 and its associated platform 8a upon lineal movement of the chain. A gear reducer-drive motor unit 86 coupled to the head sprocket 82 drives the chain for movement whereby to, in turn, cause the truck to move along the rails. The drive unit 86 is of the reversible type to enable the desired bidirectional movement of the truck between the feed conveyor and its associative platform 8a. A switch or other control instrument or means is provided to control the operation of the drive unit and to coordinate the direction of movement of travel of the truck mechanisms with the feed of articles into load pick-up positions along the conveyor 14. It is to be noted that the sprockets 46 48 and 50 while coupling the truck for movement with the chain, will be held stationary relatively of the chain 80 by the bed 36 and load, if any, as the truck itself is powered for travel along the rails by sprockets 82 and 84, chain 80 and drive unit 86.

Now, with regard to the construction of the cam lever mechanism, it will be noted that the mounting shaft 54 for the center sprocket 48 has a pair of cam follower rollers 88 and 90 attached thereto to the opposite sides of the sprocket and which are offset radially with respect to one another on the shaft 54 by approximately 50°. These cam followers are adapted to co-act with respective of a pair of fixed cams or tripper arms 92 and 94 located in the supportive track structure 26 of the trucks between the support rails thereof; with a first of the cams or tripper arms 92 located adjacent the feed conveyor 14 and in a vertical plane containing the follower roller 88 and with the other of the cams or trippers 94 located adjacent the platform 8a in a vertical plane which contains the other of the follower rollers, viz., roller 90. The cams are mounted on a respective of the brackets 96 for pivoting movement about a horizontal axis lying transversely of the longitudinal axis of the track structure. Each of the cams or tripper arms 92 and 94 includes a curved tipping edge 98 with the cam 92 adjacent the feed conveyor being disposed to pivot in its support bracket 96 relatively in a clockwise direction, as seen in FIG. 10A; for example, from a normal vertical position while constrained against rotation in the opposed or clockwise direction when in the vertical by a block or other fixed stop 100 engaging the lower end of the cam. The other of the cams 94 is mounted in the track structure 26 in mirror image fashion to the cam 92, being disposed in its support bracket 96 for pivot movement in a counterclockwise direction about its axis while constrained against pivoting movement in the opposed or clockwise direction by another stop means 100 located along the lower end of such cam. Note that the cams or tripper arms 92 and 94 are located on opposite sides of the centerline of the track structure. Also, in accordance with the invention, both tripper arms 90 and 92 are suitably counterweighted in a way as to cause the arms to revert to a vertical position when free of external restraints.

Figure 6A:
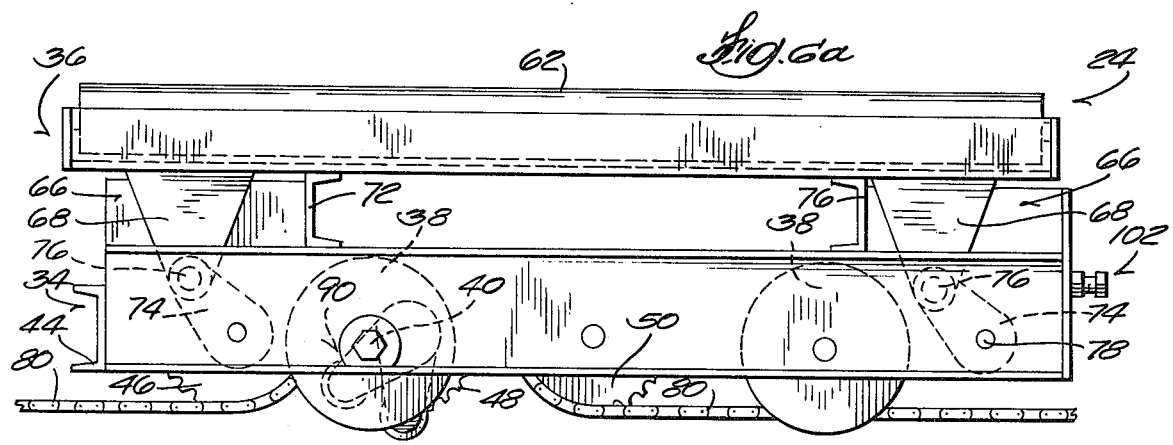
FIG. 6A is a side elevation of the shuttle car mechanisms of FIG. 5, depicting the bed portion thereof in a normally lowered position.
Figure 6B:
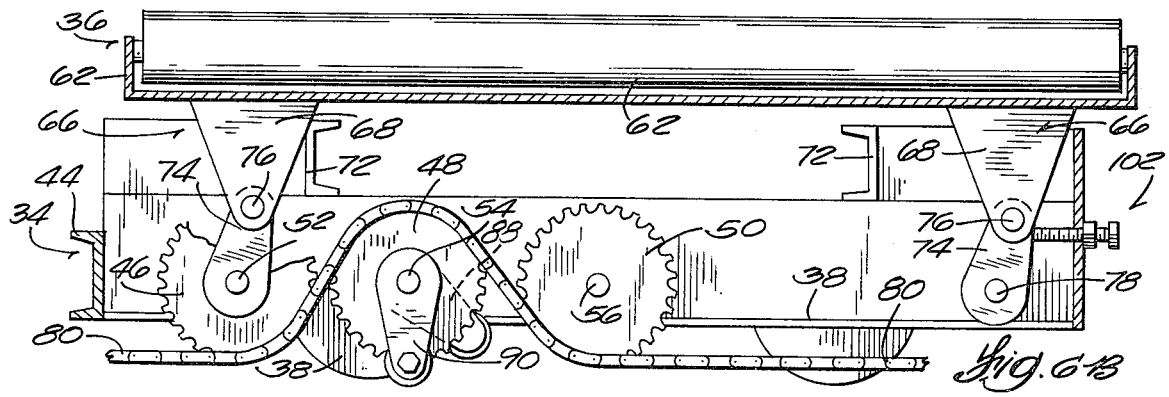
FIG. 6B is a view generally similar to FIG. 6A, only showing the bed portion of the shuttle car mechanism in a raised position.

The cams 92 and 94 are designed to interact with the follower rollers 88 and 90 to provide a selective rotating action through the endless drive chain 80 of the shafts and sprockets carried in the truck body portion as the truck is moved into and out of load pick-up and delivery positions along the ends of the track, whereby to cause through the aforesaid radius arm type connectors 66 a controlled lifting and lowering action in the truck of the bed portion 36. This action can best be explained by describing the sequence of interactions of these members during the course of a typical load transfer cycle of operation, starting with the truck device positioned intermediately between its associated platform 8a and feed conveyor 14 and moving relatively toward a load pick-up position at the feed conveyor. At this point, the truck bed portion 36 is in an unloaded, lowered position. Also, the cam follower roller 88 which, as previously seen, is operatively associated with the tripper arm 92 is at this time in a perpendicular, downwardly extending position while the other of the followers 90 is in a trailing position to the follower 88, approximately 50° removed (in a clockwise direction) from the latter. With the parts thus positioned, it will be appreciated that as the truck approaches the right-hand end of the track structure 26, the follower roller 88 will engage the tripper arm 92 along the curved edge portion 98 thereof but inasmuch as the latter is free to pivot in the bracket in a clockwise direction the follower roller 98 will in striking such arm 92 merely cause the latter to pivot sufficiently in its bracket to enable the roller to move therepast as the truck reaches an extreme right-hand position on the track structure, with the cam automatically returning to a vertical position when the follower 88 has cleared due to the counterweighting of such arm. Any tendency of the arm itself to pivot is opposed by the dead weight of the truck bed portion which acts against the center shaft 54 by way of the connectors 66 and the chain 80. The bed of the truck will therefore remain in a lowered position during this time with the two roller assemblies 58 thereof passing directly into the clearances or voids 22 provided therefor between the rollers of the feed conveyor 14 to positions directly under the load which may be assumed to have been previously advanced into a pick-up position thereon. Now then, as the truck reverses its movement and starts to move relatively away from the feed conveyor 14 the cam follower roller 88 will again engage the cam 92 but this time, of course, the engagement is from the opposed side to that previously described. The cam 92 is thereby urged to pivot relatively in a counterclockwise direction. However, as previously seen or noted, the cam is precluded from tilting in this direction by the stop block 100 and consequently the cam follower arm 88 will now be caused by the cam 92 to swing or rotate in a counterclockwise direction to clear the cam and thereby allow the truck to continue in motion. This swing movement of the follower 88 results in a corresponding rotation of the mounting shaft 54 and its sprocket 48, which movement is transmitted through the drive chain 80 and the sprocket 50 to the shaft 52. The shaft 52, in turn, in rotating causes the rocker arms 74 which are attached thereto to swing or move arcuately in a clockwise direction. With the bed portion of the truck in its normally lowered position, these rocker arms, as shown in FIG. 6A, are angularly offset (in a leftward direction) from a 90° upright position and, accordingly therefore, the rocker arms in moving in a clockwise direction as a result of the aforesaid interaction of the follower roller 88 and the tripper arm or cam 92 will cause the bed portion 36 of the truck 24 to swing upwardly in the truck to engage the load for pick-up and transfer action from the feed conveyor, all of which occurs while the truck itself is travelling in a direction away from the conveyor. The actual extent of the lift movement of the bed is dependent upon a number of variables, including, for example, the length of the radius arm of the hangar means, the diameter of the sprockets, etc., and through any one or more of these variables the vertical displacement of the truck bed may be readily controlled to provide the particular action which is desired. In the preferred construction, the variables mentioned are arranged or selected such that the truck bed in being raised to engage with and effect the pick-up of a load on the conveyor moves just over dead center. A stop means 102 is provided to engage the rocker arms 74 of the connectors 66 when the bed is raised past dead center whereby to affirmatively secure the bed at the particular elevation which is desired. These stop means take the form of bolts 104 which are threaded through end plates 106 on the side rails of the truck body portion in a position to engage the pair of rocker arms 74 in the right-hand end of the truck. The bolt means 104 are adjustable in the plates 106 to permit ready and accurate control over pivoting movement of the rocker arms 74 and corresponding control of the elevation in the truck of the bed when in the raised or lifted position. In this way, it will be seen that the truck actually picks up the load from the platform as it moves away from such platform.

Carrying forth now with a description of the operation of the truck devices 24 at the other or left-hand end of the track structure, it will be observed initially that in the previous pivoting of the follower arm 88 by the cam 92 the other of the followers, viz. follower 90, moves into a vertically, downwardly extending position, and that as the truck approaches a left-hand position of movement on the track structure the cam 92 will engage its associated tripper arm 94 along the curved portion 98 thereof. However, since this arm is free to pivot in its bracket in a counterclockwise direction, the cam (92) in striking the arm 94 will remain vertical with clearing action being provided by a pivoting of the arm 94 in the manner set forth previously during the approach of the truck to the feed conveyor. The bed portion of the truck will thus remain elevated as the truck moves fully to the lefthand of the track structure. This, of course, is necessary to permit the load carried by the head portion of the truck to clear the upper ends of the uprights 32 of the platforms 8a. It is to be realized also in this same connection that when the truck is in a fully left-hand position on the track structure the bed and the load are positioned just above and in a generally centered position to the uprights. Now, as the truck starts to move relatively away from the platform 8a, the follower arm 90 will again engage the tripper cam 94 but now, as in the instance of the pick-up cycle of operation, the necessary clearing action will result from the arm 90 rather than the cam 94 undergoing pivot or arcuate swing motion as before, there results a corresponding rotation (clockwise) of the center sprocket 48 which motion is transmitted by the chain 80 to the sprockets 46 and 50 to cause a rotation (counterclockwise) of the latter. The rocker arms 74 are, in turn, caused to swing or pivot relatively in a counterclockwise direction whereby to cause the bed portion of the truck to return to its normally lowered position in the truck and thereby cause the load carried thereon to be deposited on the platform 8a. This lowering movement of the bed takes place while the truck itself is withdrawing from the platform. This completes one full operating cycle of the transfer device and it will be seen that the cam follower rollers 90 and 92 are positioned exactly as described at the point in the operating cycle at which the description was commenced above.

A highly significant feature of the arrangement described herein for effecting the raising and lowering of the bed in the truck is that which evolves from the combination of the chain drive with a special sprocket and radial-type lever arm for effecting the raising and lowering action of the bed in the truck and which combine to cause the bed to move arcuately in the truck and relatively in a direction toward the platform or conveyor, as the case may be, at the same time as the truck itself is moving or pulling away such platform or conveyor. This unusual combination of movements of the two major or principal components of the truck results in a bed motion which is substantially vertical to the platform even though neither assembly is ever moved in a truly vertical direction by itself, and even though there is no mechanism which acts truly vertical. This motion is desired, of course, to attain maximum smoothness and stability of the loads in the load transfer action and can, of course, be obtained through conventional type lift devices. However, such conventional devices would require the truck to be held stationary, momentarily at least, during the load transfer action, thereby requiring or entailing additional controls and instrumentalities in the operating circuit of the device in the system. The truck, of course, is required to stop at the end of the rails as an incident to reversing its direction of travel but this is only of a momentary deviation and has little, if no, significant effect on the overall cycling time of the truck mechanism. Thus, with the mechanism of the invention, a smooth, gentle transfer of the loads from between the fixed platforms and the truck is provided, even though the transfer is effected while the truck is in motion.

While not shown herein, it will be understood that the system includes a suitable control circuit for coordinating the action of the various load transfer mechanisms with the conveyors and with the aforesaid stacker crane mechanisms in a way as to provide the system a high degree of operating efficiency and a high article handling capacity. The control circuit may include pivotable signal rollers arranged in the bed of the conveyors opposite to the individual load transfer mechanisms as well as photoelectric drives, proximity switches, or the like, for energizing or de-energizing the load transfer devices in accordance with the position of such signal rollers. Similar type rollers and/or devices may be provided at the load transfer platforms to coordinate the operation of the load transfer devices with the stacker crane mechanisms.

In a load storage system such as the type set forth herein, it is generally necessary that the load in being placed on the delivery platform for ultimate pick-up action by and transmittal to the rack by the load transport devices 10 be deposited quite accurately on the platform, as the usual or typical such transport device requires fairly close tolerances for its proper operation, usually within the range of plus or minus one-fourth inch. The maintenance of these tolerances normally is a fairly burdensome problem in the systems of the present type, and to achieve these tolerances it has heretofore been necessary to incorporate elaborate controls into the system, thereby increasing cost and complicating the overall maintenance of the system. The present system includes features which are designed to alleviate this problem whereby to assure the placement of the loads on the platform or pedestal within the required tolerances. In considering these features, it is well to note, initially, that the platforms for the incoming articles have plates 108 mounted to the two outboardmost uprights 32, relatively to the truck itself, to provide a stop for the loads being moved thereto by the truck devices. The loads in being moved onto the uprights are moved sufficiently thereover by the truck devices to engage the loads with these plates thereby to square the loads on the truck as the truck completes movement on the track structure but prior to the lowering of the bed portion thereof. To assure that the load remains squared and within the tolerances required when the bed is dropped to the level of the pedestals by truck movement therefrom, the inboard set of uprights are each provided with a block 110 which is spring loaded in a manner as to permit the incoming loads to pass freely thereover as the truck moves into and between the pedestals while at the same time acting as a stop to the loads tending to move in the opposite direction. The blocks are generally located in the pedestals in a position such that with the load engaged along one edge with the stop plates 108, as aforesaid, some clearance is maintained between the opposed edge of the load and the blocks. This clearance is normally absorbed by the loads when the truck mechanism moves from the platform as the bed portion of the truck normally remains in the plane of the upper end of the uprights during truck withdrawal and there is a consequent drag action on the loader tending to cause the latter to move with the truck device as the latter moves away from the platform. The blocks 110 in combination with the plates 108 thus serve to index the loads accurately on the platforms 8a in the principal direction of their movement in a load transfer cycle. At the same time, the load is caused to be "squared" with respect to the platform itself. To index the loads on the platforms in a direction which is 90° to the above, means such as a deflector plate 112 is mounted along one side of the track structure 26 of each of the mechanisms 12a to engage the loads from one side thereof during the final approach movement of the loads or articles to the platforms 8a whereby to displace the articles or loads laterally of the transfer car mechanism to a pre-set or pre-determined position thereon during the course of approach movement to the platforms 8a. The plate 112 is preferably mounted in the track structure 26 through some type of readily adjustable bracket structure (not shown) so as to enable the amount of lateral or sideways deflection which is being imparted to the loads by the plate to be controlled to insure that final load placement on the platform meets the requirements of the particular load transport device 10 servicing such platform. The roller assemblies 58 of the truck bed portion 36 are critical to this action of the deflector plates 112 on the loads being moved therepast by the truck devices 24, particularly where the loads being handled in the system are of a substantial mass and/or have a lower surface which is highly resistant to slide movement or are contained in an enclosure, box, crate or the like, having a high resistance to skid or slide movement.

To further aid in achieving a high degree of precisional accuracy between the loads being deposited on the platforms 8a and the motorized load transport devices 10, it is contemplated to incorporate one or more conventional dash-pot mechanisms 114 in the truck devices 24 to dampen the movement of the head portion 36 thereof to its return or normally lowered position in the truck for the purpose of achieving a gentle dropping or depositing of the loads on the platforms and a consequent greater control over the final at rest position of the loads on the platforms. The dash-pots are of further advantage in that they provide a buffering of the impact or shock forces arising during the depositing of the loads on the platforms, thereby mitigating against damage to the loads, as well as to both the platforms and the truck devices themselves. In the particular embodiment which is shown, the dash-pot mechanisms are arranged to the opposed sides of the truck devices, with the cylinder element 116 of the dash-pot being pivotally attached to the truck body portion 34 through a corresponding one of the side rails 42 thereof and with the piston element 118 being similarly pivotally connected to the truck bed portion 36 via respective of the roller assemblies 58. While specific design details of the dash-pot mechanisms 114 are omitted herefrom since they are in all respects in accordance with known practice, it is well to note that the mechanisms are of a self-contained construction and include a suitable fluid circulation systems which includes a valve arrangement permitting free fluid flow in one direction of dash-pot movement (the extending direction in the present case) while impeding fluid flow in the opposite (or retracting) direction of movement.

As above noted, the spring loaded plates 110 are positioned so as to engage the loads along the inboard edge (relative to the truck devices) during the course of the withdrawal of the truck devices from the platforms, the loads tending to move out with the truck devices at such time due to the slight drag of the loads on the truck bed portion 36. This engagement of the loads with the plates 110 tends also to hold the bed portion of the truck in place as the truck moves from the platforms 8a, the net effect of which is to cause the bed portion of the truck to move back beyond a dead center position in the truck and to return of its own accord to a normally lowered position in the truck. This action can be availed of in lieu of that between the arm follower 90 and the tripper cam 94 to effect desired lowering movement of the bed portion 36 in the truck during the depositing of the load on the platform, in which case, of course, it would be possible to eliminate both the follower roller 90 from the shaft 54 and the tripper cam 94 from the track structure 26. In the preferred form of the invention, however, the members 90 and 94 are utilized so that if for some reason the bed portion is not caused to be tripped during the load deposit operation by the aforesaid interaction between the load and the blocks 110 the bed will not remain in an elevated position when the truck reaches a load pick-up position at the feed conveyor 14, since under such circumstances damage to equipment and/or to the loads would likely result. Also, the members 90 and 94 are utilized to affirmatively trip the bed portion of the truck device in any operating cycle of the truck where, for one reason or another, the truck arrives at the platform 8a in an unloaded condition.

The shuttle car mechanisms 12b for the outgoing loads or articles while essentially alike in all respects to the mechanisms 12a operate in just the reverse fashion to the latter to provide for the pick-up of an article or load from the associated one of the platforms 8a and the depositing of the article or load on the discharge conveyor 16. Thus, in the case of mechanisms 12b, the movable bed portion of the truck device is in a lowered position when the truck device reaches a left-hand position on its associated track structure and raises or is lifted upwardly in the truck as the latter proceeds from such position whereby to engage a load positioned on the particular one of the platforms 8b associated with such mechanism for pick-up and transfer action. Similarly, the bed portion of the mechanisms 12b remains in an elevated position until the truck, having completed movement to the right-hand end of the track, reverses its movement and starts to pull away from the discharge conveyor at which time the bed portion drops to its normal position in the truck to cause the load carried thereby to be deposited on the discharge conveyor. It should be noted that in the case of the mechanisms 12b the bed portion thereof in being lifted to receive a load from the platform 8b simultaneously moves away from the direction in which the truck proper is moving. More particularly, in the case of the mechanisms 12b the bed portion swings up and to the left as the truck itself moves in a left-to-right direction from the platform 8b. This is the exact same type of relative movement which occurs in the bed portion and the truck itself of the first described mechanisms 12a in receiving a load from the feed conveyor 14. Also, in the case of the mechanisms 12b, the bed portion moves down and to the right as the truck moves in a leftward direction from the discharge conveyor 16 and this, too, is the same relative motion which occurs between the bed portion and the truck itself of the mechanisms 12a in effecting the deposit of a load on one of the platforms 8a. In order to attain this type of motion in the bed portion of the mechanisms 12b, it is necessary that the supports for the bed portion itself, and which may conform to the radius arm type connectors 66 provided for the bed of the mechanisms 12a, be arranged such that with the bed portion in a normally lowered position the rocker arms 74 or the equivalent thereof are to the right of a 90° upright position rather than to the left, as is the case for the mechanisms 12a. Also, in the case of the mechanisms 12b the trip arm which is adjacent the platform 8b is designed to produce, through an identical chain and sprocket arrangement as set forth for the mechanisms 12a, a counterclockwise turning movement of the rocker arms as the truck starts to move away from the platform thereby to cause the bed portion to swing up in a desired leftward direction of movement as the truck draws away from such platform. The bed portion is, as before, swung to an over center position so as to remain in an elevated position to the point where unloading is to be effected. In this case, the stop means for the bed portion, and which may be of the same construction as set forth for the stop means 100 of the mechanisms 12a, are positioned in the left-hand end of the truck rather than the right. The trip arm which is adjacent the discharge conveyor is then, in the case of the mechanisms 12b, arranged to produce an opposite or clockwise turning movement of the radius arms of the bed support means upon contact with the follower roller of the truck device as the latter proceeds from the discharge conveyor 16. These movements in the bed supporting means may, if desired, be produced by a tripper arm arrangement which is exactly as set forth for the arms 92 and 94 of the devices 12a. In this case, however, the relative positions of the cam follower rollers corresponding to the rollers 88 and 90 would be reversed to that set forth for the mechanisms 12a so that the roller 90 would initially engage its tripper arm as the device approached a load pick-up position and the pivoting of such roller by its arm in the course of a load pick-up operation would move the other of the rollers, roller 88, to an active or vertical downwardly extending position.

In the particular embodiment of the invention shown, the chain 80 of the drive means is of an endless construction and constitutes the means by which rotational movement of the cam follower rollers is transmitted from the center sprocket 48 to the sprocket 50 on the mounting shaft 56 to control the raising and lowering of the bed portion of the truck mechanisms through the radius arm type connectors which are associated with such shaft. Other arrangements are contemplated for transmitting motion of the follower arms into arcuate swing movement of the bed portion of the transfer mechanism where, for one reason or another, it is desired to simply dead end the chain at the opposed ends of the movable truck portion of the transfer mechanism itself. Thus, for example, a short length of chain could be extended diagonally between and partially around the sprockets 48 and 50 with its opposite ends secured to respective of the sprockets. A second length of chain trained in a similar, but 90° diagonally, oppositely extending direction between a second sprocket associated with each of the sprockets 48 and 50 would generally be utilized in this alternative to maintain the first chain under continuous tension. Other means such as a lever, bar, rod, or the like, could be fastened directly between the sprockets 48 and 50 in a manner as to transmit arcuate motion therebetween.

The load handling mechanisms set forth herein by utilizing the motion of the transfer mechanism itself to power the load conveying bed portion thereof for load pick-up and deposit action in the course of a load transfer cycle as opposed to more conventional means such as a hydraulic or air powered piston-cylinder mechanism or an electric motor, for example, completely obviates the necessity of extending hydraulic, air or electrical supply lines into and along the length of the separate mechanisms to effect such movement and of providing elaborate controls in the mechanisms for controlling the operation of such means. By avoiding this necessity of an external source of power for actuating the bed portion for vertical movement, the invention considerably reduces the cost and operational complexity of the individual mechanisms themselves. Truly significant savings in cost and overall operational efficiency are achieved in a total system embodying the invention as here the benefits of a single such load transfer device may be realized many times over as it is not uncommon for a single system to employ anywhere from 20 to 100 or more individual load transfer devices.

Beyond this, with the present invention the novel load pick-up and deposit actions are accomplished while the mechanism itself is in movement, cycling time of the mechanism itself is kept to a minimum, thereby enhancing the overall operational efficiency of the system itself while rendering it possible to maximize the load handling capacity of any given system. The loads or articles themselves are at all times handled in a smooth manner in the system, with critical accuracy in load placement on the platforms, conveyors or other means being serviced by the devices of the invention being attained without resort to elaborate control devices and instrumentalities therefor.

Various modes of carrying out the present invention are contemplated as being within the scope of the following claims particularly pointing out and distinctly claiming the subject-matter regarded as the nature of the present invention.

We claim:

1. In a storage system of the multiple aisle rack type and which includes motorized load carrier devices operating in and along the aisles to effect the movement of incoming articles into the racks from individual of a first series of transfer stations located adjacent the ends of the racks and to also effect the movement of outgoing articles from the racks to individual of a second series of transfer stations located also adjacent the ends of the racks in positions intermediate the first series of transfer stations, a load transfer device operatively associated with each of the transfer stations of the first and second series for initially delivering articles to the first series of transfer stations and for picking up articles from the second series of transfer stations, means for supporting said transfer device for movement in a fixed, lineal travel path which includes a corresponding one of said transfer stations and having a frame portion and a bed portion supported in said frame portion for vertical swing movement between a raised article pick-up positon in the transfer device and a lowered article deposit position therein, a drive means for powering said transfer device along said fixed travel paths and relatively toward and away from said transfer stations, said drive means including a lineal member extending longitudinally of the fixed travel paths of such devices and operatively coupled intermediate its ends to said devices, and means for translating lineal movement of said transfer devices through a predetermined portion of its travel path in a direction toward or away from said transfer stations into vertical swing movement of the bed portion of said devices whereby to automatically effect a selective article pick-up and deposit action at such stations, said means including first and second rotatable shafts carried in the frame portion of each of said devices, a cam follower means keyed to said first shaft, a fixed cam mounted adjacent said transfer stations in the path of travel of said devices and disposed to engage with and cause a predetermined angular displacement of said cam follower means and said first rotatable shaft upon the transfer device moving through said predetermined portion of its travel path, sprocket means keyed to each of said first and second rotatable shafts, linkage means for transmitting rotational movement of the sprocket means keyed to said first shaft to the sprocket means of said second shaft, and radius arm means connected between said second shaft and the bed portion of said load transfer device for translating rotational movement of said second shaft into vertical swing movement of said bed portion.

2. The construction of claim 1 wherein the linkage means for transmitting rotational movement of the one sprocket means to the other includes the lineal member of said drive means.

* * * * *